May 18, 1948.  F. O. GILLIN  2,441,809
ELECTRIC CONDENSER MOUNT
Filed Dec. 24, 1942
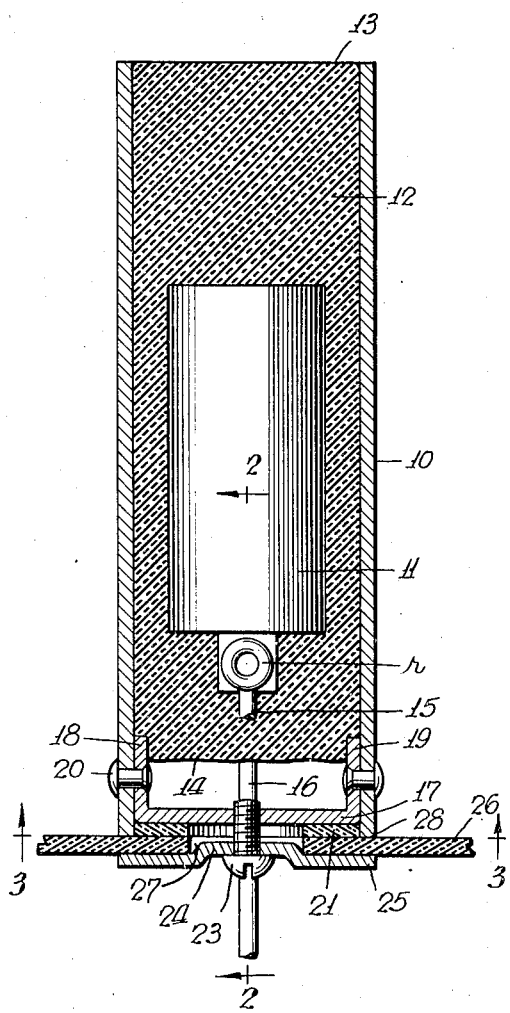
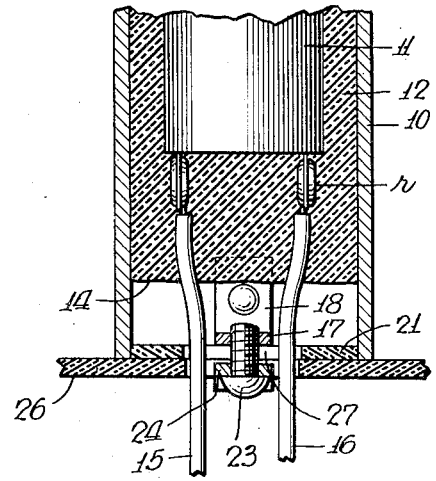
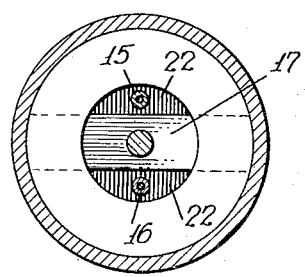
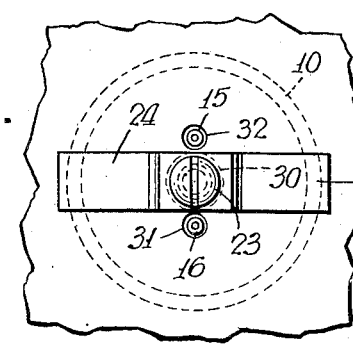
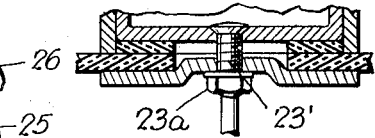
INVENTOR
*Francis O. Gillin*
BY
*Dean Fairbank & Hirsch*
ATTORNEYS Patented May 18, 1948

2,441,809

UNITED STATES PATENT OFFICE 2,441,809

ELECTRIC CONDENSER MOUNT

Francis Owen Gillin, New Bedford, Mass., assignor, by mesne assignments, to Aerovox Corporation, New Bedford, Mass., a corporation of Massachusetts Application December 24, 1942, Serial No. 470,065

2 Claims. (Cl. 248—361)

The present invention is shown applied to the mounting of electrical condensers that have tubular non-metallic shells, although in certain of its aspects the invention is applicable to other types of condensers and the casings therefor and to other electrical units such as batteries, induction coils, resistors and the like.

An object of the invention is to provide a condenser and mounting appurtenances therefor, made of few parts and of low cost which shall be easy to install and which shall require a minimum of available space at the underside of chassis or other mounting plate or base.

Another object is to provide a structure of the above type, that will readily accommodate and securely mount a condenser serving as replacement upon a chassis or other support designed for accommodating more elaborate condenser mounting appurtenances.

In the accompanying drawings in which are shown one or more of various possible embodiments of the several features of invention, Fig. 1 is a view in longitudinal cross-section through the mounted condenser, Fig. 2 is a fragmentary transverse sectional view taken on line 2—2 of Fig. 1, Fig. 3 is a transverse sectional view taken on line 3—3 of Fig. 1, Fig. 4 is a fragmentary view of a modification, and Fig. 5 is a bottom plan view of the condenser showing a slight modification in the chassis plate.

Referring now to the drawings, the condenser desirably comprises an open ended cardboard tubular container 10, desirably cylindrical, within which is mounted the active condenser element 11 which may be of any conventional construction, such as a roll incorporating the two metal foil electrodes and the associated sheets of dielectric (not shown). The condenser element is mounted in protected position within the tube by completely imbedding the same in filler, desirably a mass of congealed or hardened plastic 12 such as wax, pitch, or the like, which adheres to the inner wall of the tube, which extends flush with one end of the tube as at 13 to constitute a closure or plug and which does not quite extend to the opposite end of the tube as shown at 14.

The condenser has a pair of flexible terminal leads 15 and 16 which may be riveted as at r to the respective electrodes, said leads protruding as shown beyond the pitch, wax, or other filler.

A cross brace, desirably of metal, and preferably in the form of a yoke 17 extends within tube 10 across the open end thereof, its arms 18 and 19 engaging diametrically opposite parts of the inner wall of the tube, and being preferably riveted thereto at 20 to secure the yoke in place.

Desirably the yoke is slightly countersunk with respect to the extremity of the tube and a fiber disk 21 is frictionally or adhesively retained within the rim of the tube so as to expose through the end of the tube the mid portion of the yoke and a pair of segment shaped openings 22 through which the respective flexible leads 15 and 16 may protrude in spaced relation straddling the yoke.

A clamping bar 24 is provided which may be of a length but slightly greater than the diameter of the chassis hole and has a raised or indented mid portion and lateral wings 25. A screw 23, axially of the tube, connects the middle of the yoke and the middle of the clamping bar 24. Desirably the shank of the screw is threaded into yoke 17 as shown in Fig. 1 and its head exerts pressure against the clamping bar. Alternatively, as shown in Fig. 4, a screw shank 23' is rigid with the yoke, and nut 23ª threaded upon the lower end thereof exerts like pressure.

As shown in Fig. 1, the unit is readily mounted by superposing the same over the chassis plate or other mount or base 26, then applying the screw 23 over which the clamping bar 24 has first been placed, through a corresponding aperture 27 in the chassis plate and then threading it into the yoke 17 until the wings 25 of the clamping bar are tightly pressed against the under face of the chassis plate. The indented or raised mid-section of the clamping bar extends diametrically across and into aperture 27 and thus serves to center the unit with respect thereto. The pressure transmitted through the screw presses the rim 28 of the condenser shell against the chassis plate for security of mount. The flexible leads 15 and 16 extending through the segment shaped openings 22 laterally of the yoke 17 pass through the aperture 27 in the chassis plate and protrude beyond the clamping bar 24 for electrical connection.

Instead of the single aperture 27 in the chassis plate through which extend the mounting screw as well as the terminal leads, there may be provided three smaller apertures 30, 31, and 32, as shown in Fig. 5, one for the screw 23, and one for each of the flexible terminal leads 15 and 16.

It will be seen that the construction is quite inexpensive, yet effective in use. It has the further advantage that the mounting appurtenances extend but a small fraction of an inch below the chassis plate, so that it is adapted for compact installation where the greater bulk of more elaborate terminal instrumentalities could not be accommodated.

The construction of the present invention is useful as replacement for the more elaborate condenser heretofore employed. No adaptation or other modification in the chassis or other support is required for this purpose, as the same hole 27 in the chassis used for the familiar mounts serves to accommodate the simplified mount of the present invention.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described by invention, what I claim as new and desire to secure by Letters Patent of the United States is:

1. A device for mounting an electrical unit including a shell open at one end thereof upon a chassis having a mounting aperture therethrough, said device comprising a cross brace within said shell at the open end thereof and rigidly affixed thereto, a screw threaded into said cross brace and extending through said mounting aperture, a clamping bar about the shank of said screw and disposed on the opposite side of said chassis from said unit, said clamping bar extending over a portion of said mounting aperture to provide access therethrough to said unit, said cross brace and said clamping bar serving as a mounting clamp for affixing said unit upon said chassis when the screw is tightened in place.

2. A device for mounting an electrical unit including a shell upon a chassis having a mounting aperture therethrough, said device comprising a cross brace within said shell at one end thereof and rigidly affixed thereto, a screw threaded into said cross brace and extending through said mounting aperture, a clamping bar about the shank of said screw and disposed on the opposite side of said chassis from said unit, said clamping bar extending over a portion of said mounting aperture to provide access therethrough on either side thereof to said unit, said clamping bar having an indented midsection coacting with said mounting aperture and serving to center the unit with respect to said aperture, said cross brace and said clamping bar serving as a mounting clamp for affixing said unit upon said chassis when the screw is tightened in place.

FRANCIS OWEN GILLIN.

REFERENCES CITED

The following references are of record in the file of this patent:

UNITED STATES PATENTS

| Number | Name | Date |
|---|---|---|
| 1,133,976 | Kraus | Mar. 30, 1915 |
| 2,014,820 | Snider | Sept. 17, 1935 |
| 2,108,398 | Allen | Feb. 15, 1938 |
| 2,183,092 | De Lange | Dec. 12, 1939 |
| 2,211,728 | MacFadden | Aug. 13, 1940 |

FOREIGN PATENTS

| Number | Country | Date |
|---|---|---|
| 63,240 | Austria | Jan. 26, 1914 |
| 597,949 | France | Sept. 14, 1925 |